United States Patent

Shmidl et al.

[15] 3,644,178

[45] Feb. 22, 1972

[54] AROMATIC ESTER RECOVERY

[72] Inventors: Albert J. Shmidl, Crosby; Edgar C. Winegartner, Baytown, both of Tex.

[73] Assignee: Esso Research and Engineering Company

[22] Filed: June 12, 1969

[21] Appl. No.: 832,843

[52] U.S. Cl. ....................................203/29, 203/50, 203/88, 260/475 B

[51] Int. Cl. ........................................................C07c 67/06

[58] Field of Search ..................260/475 R, 47 S; 203/29, 50, 203/88

[56] References Cited

UNITED STATES PATENTS 3,022,333 2/1962 Kalfadelis et al. ....................260/47 S

OTHER PUBLICATIONS

Homoia, As cited in Chem. Abstracts, 68, 21710a (1968).

*Primary Examiner*—Lorraine A. Weinberger
*Assistant Examiner*—E. Jane Skelly
*Attorney*—Thomas B. McCulloch, Melvin F. Fincke, John S. Schneider, Sylvester W. Brock, Jr., Kurt S. Myers and Timothy L. Burgess

[57] ABSTRACT

In the recovery of aromatic esters, a product of improved color is obtained when heated in the presence of antimony trioxide.

4 Claims, No Drawings

AROMATIC ESTER RECOVERY

BACKGROUND OF THE INVENTION

1. Field of the Invention

The present invention is directed to the recovery of aromatic esters, especially dimethylterephthalate by heating in the presence of antimony trioxide to obtain a product of improved color.

2. Description of the Prior Art

U.S. Pat. No. 2,879,289
U.S. Pat. No. 3,047,612
U.S. Pat. No. 3,047,613
U.S. Pat. No. 3,047,614
U.S. Pat. No. 3,123,633

SUMMARY OF THE INVENTION

In recovering aromatic esters which are produced by the oxidation and esterification of aromatic feedstocks, aromatic esters are recovered having improved color when heated in the presence of antimony trioxide. More specifically, a high-purity dimethylterephthalate is obtained when the dimethylterephthalate is heated in the presence of between 0.01 and 1.0 percent by weight of antimony trioxide.

DESCRIPTION OF THE PREFERRED EMBODIMENTS

Aromatic esters are made in a number of different manners involving the oxidation and esterification of aromatic feedstocks. In a preferred method, the aromatic feedstock containing at least one aromatic hydrocarbon ring substituted with a plurality of $C_1$ to $C_4$ alkyl groups may be oxidized with molecular oxygen in the presence of an esterification compound such as methanol and catalyzed with a calytic amount of a polyvalent metal oxidation catalyst.

The various aromatic feedstocks which may be oxidized to produce the esters as well as the reaction conditions employed are known. Suitable reaction conditions are set forth, for example, in U.S. Pat. Nos. 3,047,612; 3,047,613; 3,047,614 and 3,123,633. The product which is obtained in the esterfication process set forth in these patents is a crude product of aromatic ester, aromatic acid and other byproducts. Specifically disclosed in these patents is the oxidation and esterification of paraxylene to produce a product containing dimethylterephthalate.

To recover the organic ester, specifically dimethylterephthalate in high purity, it is necessary to heat the crude product such as in a distillation or flashing vessel to obtain the crude aromatic ester. This crude product is then preferably recovered by recrystallizing and again heating such as in a distillation column to obtain the aromatic ester in high purity. Other specific recovery methods may be employed to obtain the aromatic ester in high purity.

According to the present invention, the aromatic esters are heated in the presence of antimony trioxide. The presence of antimony trioxide in the heating steps produces a product of high purity without undesirable color. Further, problems of corrosion to steel and stainless steels are prevented. Furthermore, it has been found that the product heated in the presence of the antimony trioxide may also have a lower acid number than when the product is heated without the antimony trioxide being present. The amount of antimony trioxide used may be between 0.01 and 1.0 percent by weight. A preferred range is between 0.025 and 0.10 percent by weight.

In addition to the presence of antimony trioxide, the recovery and purification of aromatic esters may be carried out in the presence of a neutralization agent such as magnesium oxide and the like. Since the aromatic ester is often present with the corresponding acid, a neutralization agent will help in keeping the acid number low as the aromatic ester is heated in the recovery method.

The production of aromatic esters such as dimethylterephthalate of high purity and having no undesirable color is of particular importance since the esters are used as monomers in the production of polyesters. A colored aromatic

TABLE I.—SIMPLE DISTILLATION OF HERCULES DMT [1]

| | Number | | | | | | | | | | | | | | | | | | | | | | | | |
|---|---|---|---|---|---|---|---|---|---|---|---|---|---|---|---|---|---|---|---|---|---|---|---|---|---|
| | 1 | | | | | 2 | | | | 3 | | | | 4 | | | | 5 | | | | 6 | | | |
| Charge grams | 516 | | | | | 537 | | | | 568 | | | | 549 | | | | 599 | | | | 571 | | | |
| Added | | | | | | | | | | 0.2 grams MgO | | | | 2.0 grams $CaCO_3$ | | | | 2.0 $TiO_2$ | | | | 2 grams $Sb_2O_3$ | | | |
| Preheat time | | | | | | | | | | | | | | | | | | | | | | | | | |
| Distillation time | 2 hours–10 minutes | | | | | 5 hours | | | | 1 hour | | | | 1 hour | | | | 1 hour | | | | 1 hour stir (1 hour dist.) | | | |
| Percent bottoms | 0.89 | | | | | 1.15 | | | | 1.45 | | | | 5.8 | | | | 9.3 | | | | 5.6 | | | |
| Fraction weight percent | 30.0 | 29.0 | 22.0 | 14.0 | 3.8 | 28.6 | 31.8 | 24.0 | 13.5 | 20.5 | 22.1 | 25.3 | 24.8 | 23.8 | 27.5 | 25.7 | 17.0 | 21.2 | 28.7 | 22.8 | 17.4 | 25.7 | 21.1 | 24.7 | 22.1 |
| Acidity, meq./kg | 1.2 | 2.6 | 4.2 | 3.8 | 9.0 | 2.3 | 4.3 | 9.9 | 24.6 | 1.2 | 1.3 | 2.9 | 5.8 | 3.3 | 1.7 | 6.8 | 3.8 | 2.1 | 2.8 | 4.2 | 8.0 | 0.4 | 0.6 | 0.9 | 1.6 |
| Color, percent transmission at 420 mμ hours at 350° F.: | | | | | | | | | | | | | | | | | | | | | | | | | |
| 0 | 97 | 97 | 88 | 97 | ------- | 98 | 97 | 86 | 88 | 99 | 99 | 99 | 93 | 100 | 100 | 100 | 100 | 100 | 100 | 100 | 99 | 100 | 100 | 100 | 100 |
| 1 | 96 | 97 | 89 | 97 | ------- | 96 | 94 | 85 | 87 | 98 | 98 | 98 | 90 | 99 | 100 | 99 | 99 | 100 | 100 | 100 | 98 | 100 | 100 | 100 | 100 |
| 2 | 94 | 97 | 89 | 96 | ------- | 96 | 93 | 85 | 86 | 98 | 98 | 98 | 92 | 97 | 100 | 98 | 98 | 99 | 100 | 99 | 96 | 100 | 100 | 100 | 100 |
| 3 | 92 | 96 | 88 | 94 | ------- | 95 | 93 | 84 | 85 | 97 | 96 | 95 | 92 | 98 | 100 | 97 | 98 | 98 | 100 | 98 | 95 | 100 | 100 | 100 | 100 |
| 4 | 91 | 93 | 87 | 93 | ------- | 94 | 92 | 83 | 84 | 96 | 94 | 95 | 90 | 96 | 99 | 96 | 98 | 98 | 99 | 97 | 93 | 100 | 100 | 100 | 100 |
| 5 | 89 | 93 | 87 | 92 | ------- | 92 | 92 | 82 | 83 | 96 | 94 | 95 | 91 | 96 | 99 | 96 | 97 | ------- | | | | | | | |

[1] Activity: 0.4 meq./kg. (milliequivalents/kilogram).

ester or one having a high-acid number indicating the presence of an impure product is objectionable for use in making the polyester polymers.

The present invention will be further described and illustrated in the following examples which are set forth as illustrative of the invention and not as limitations on the scope of the invention.

problem of objectionable and undesirable color formation is illustrated by distilling a high-purity dimethylterephthalate and measuring its color by the percentage transmission at 420μ at various time periods at 350° F. The results of the simple distillations in laboratory glass equipment are set forth in Table I hereinafter.

As is shown in Table I, merely heating a pure aromatic ester creates a color problem as is evidenced by the decrease from 100 percent transmission. However, as is shown in Example 6 of Table I, the presence of antimony trioxide resulted in 100 percent transmission of all fractions over a five hour time period.

The preferred recovery scheme according to the present invention is to recover a crude product by a first distillation, recrystallizing the aromatic ester such as dimethylterephthalate and then obtaining a heart cut from a final distillation. The significance of having the antimony trioxide present while heating the aromatic ester during distillation is shown in Table II hereinafter.

TABLE II.—PURIFICATION OF CRUDE FLAKED DMT

| Processing scheme | Distillation recrystallization simple distillation | Simple distillation recrystallization simple distillation |
|---|---|---|
| Initial distillation: | | |
| Number of plates | 10 | 0 |
| Reflux ratio | 2/1 | 0 |
| Pressure, mm. of Hg | 760 | 760 |
| Absolute: | | |
| Additive, $Sb_2O_3$, p.p.m. | 1000 | 0 |
| Overhead fraction, weight percent | 83 | 96 |
| Bottoms fraction, weight percent | 2 | 4 |
| Loss, weight prcent | 15 | 0 |
| Recrystallization in paraxylene: | | |
| Yield, weight percent | 81 | 90 |
| Acidity, meq./kg | 13 | 2+ |
| Final distillation: | | |
| Number of plates | 0 | 0 |
| Reflux ratio | 0 | 0 |
| Pressure, mm. of Hg | 760 | 760 |
| Absolute: | | |
| Additive, $Sb_2O_3$, p.p.m. | 1000 | 0 |
| Front end fraction, weight percent | 17 | 26 |
| Percent transmission at 420 mμ after 0 and 6 hours at 350° F | 100/100 | 98/96 |
| Acidity, meq./kg | 5.4 | 20+ |
| Heart cut fraction, weight percent | 68 | 42 |
| Percent transmission at 420 mμ after 0 and 6 hours at 350° F | 100/100 | 81/75 |
| Acidity, meq./kg | 1.7 | 20+ |
| Bottoms, weight percent | 13 | 8 |
| Loss, weight percent | 2 | 24 |

As is shown in Table II, the presence of 1,000 p.p.m. of antimony trioxide in both the initial distillation and final distillation resulted in a heart cut fraction having no undesirable color. Further, it is noted that the acidity of the recovered dimethylterephthalate is considerably lower than that when no antimony trioxide was present.

The nature and object of the present invention having been completely described and illustrated and the best mode thereof contemplated set forth, what we wish to claim as new and useful and secure by Letters Patent is:

1. In a method for recovering dimethylterephthalate, produced by direct oxidation-esterification of paraxylene in the presence of methanol, free oxygen containing gas, and a polyvalent metal oxidation catalyst to produce a product containing dimethylterephthalate, the step of recovering said dimethylterephthalate by heating said product to distillation or flashing temperature in the presence of an amount of antimony trioxide between 0.01 and 1.0 percent by weight.

2. A method in accordance with claim 1 wherein said heating is in the flashing of said product to recover purified dimethylterephthalate.

3. A method in accordance with claim 1 wherein said heating is in the distillation of said product to recover purified dimethylterephthalate.

4. A method according to claim 1 wherein said antimony trioxide is present in the amount of between 0.025 and 0.1 percent by weight.

* * * * *